Oct. 9, 1956 F. GUENTHER 2,765,830
RECIPROCATING HAMMER TYPE NUT CRACKING MACHINE
Filed May 28, 1953 3 Sheets-Sheet 1
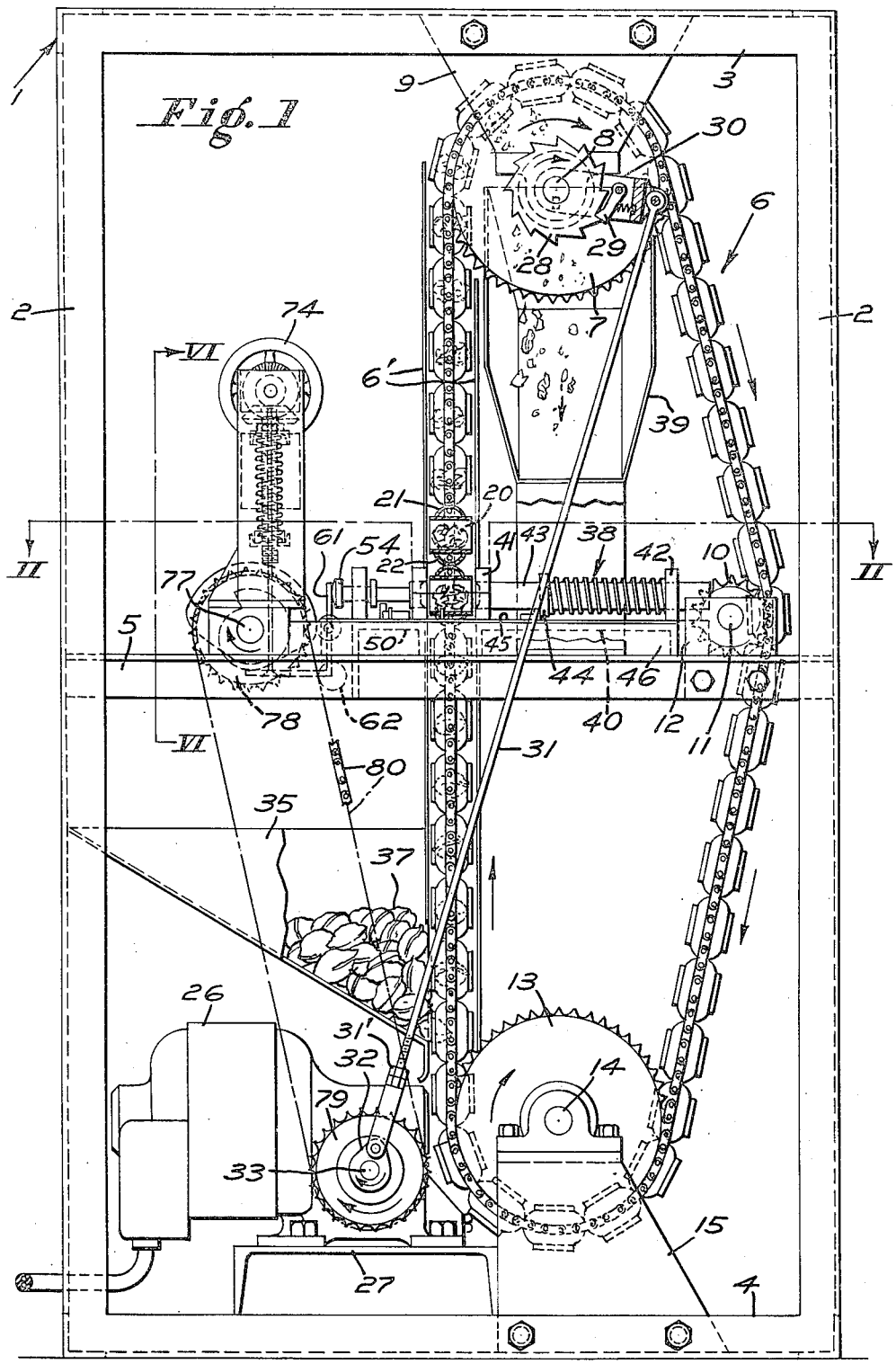

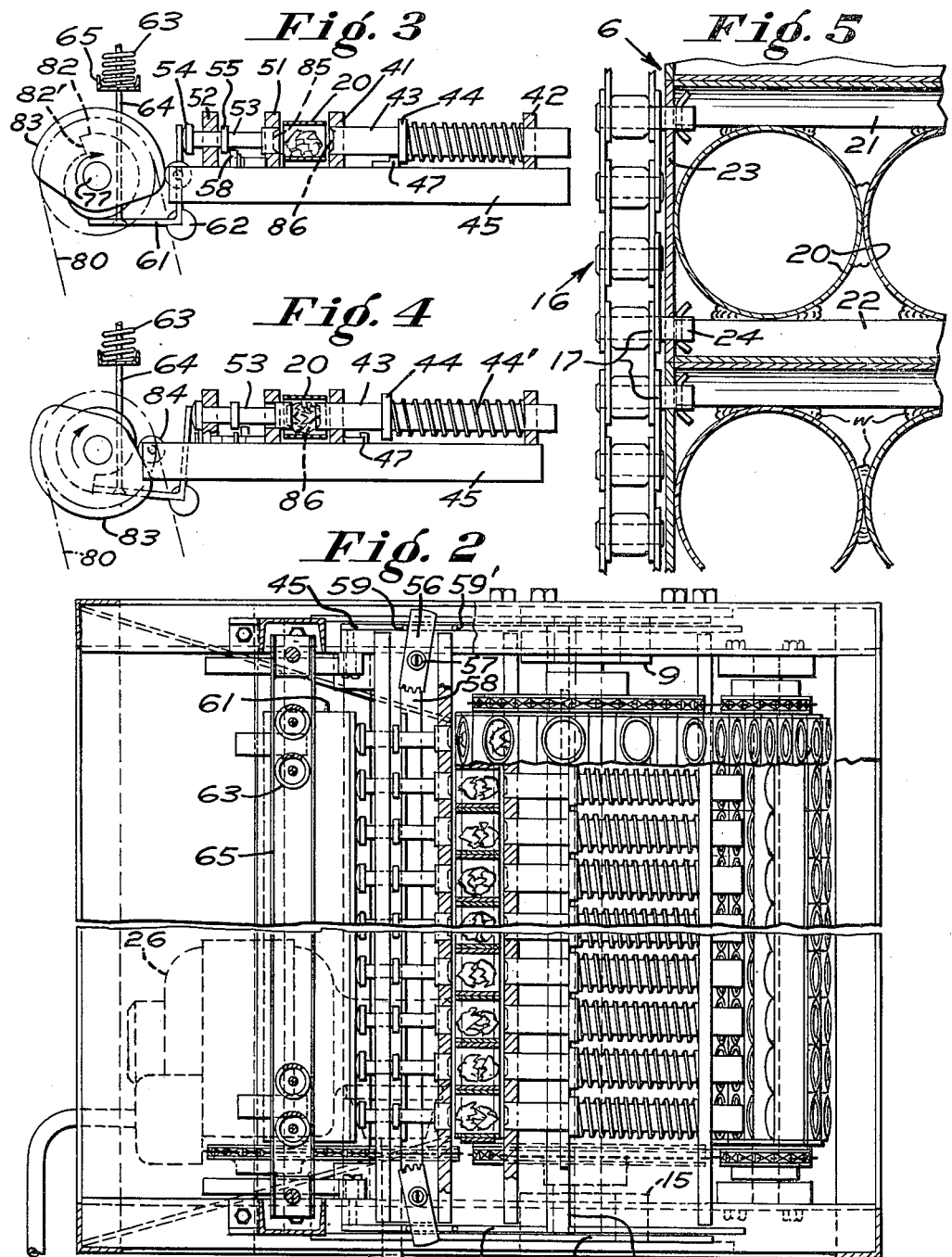

Oct. 9, 1956  F. GUENTHER  2,765,830
RECIPROCATING HAMMER TYPE NUT CRACKING MACHINE
Filed May 28, 1953  3 Sheets-Sheet 3
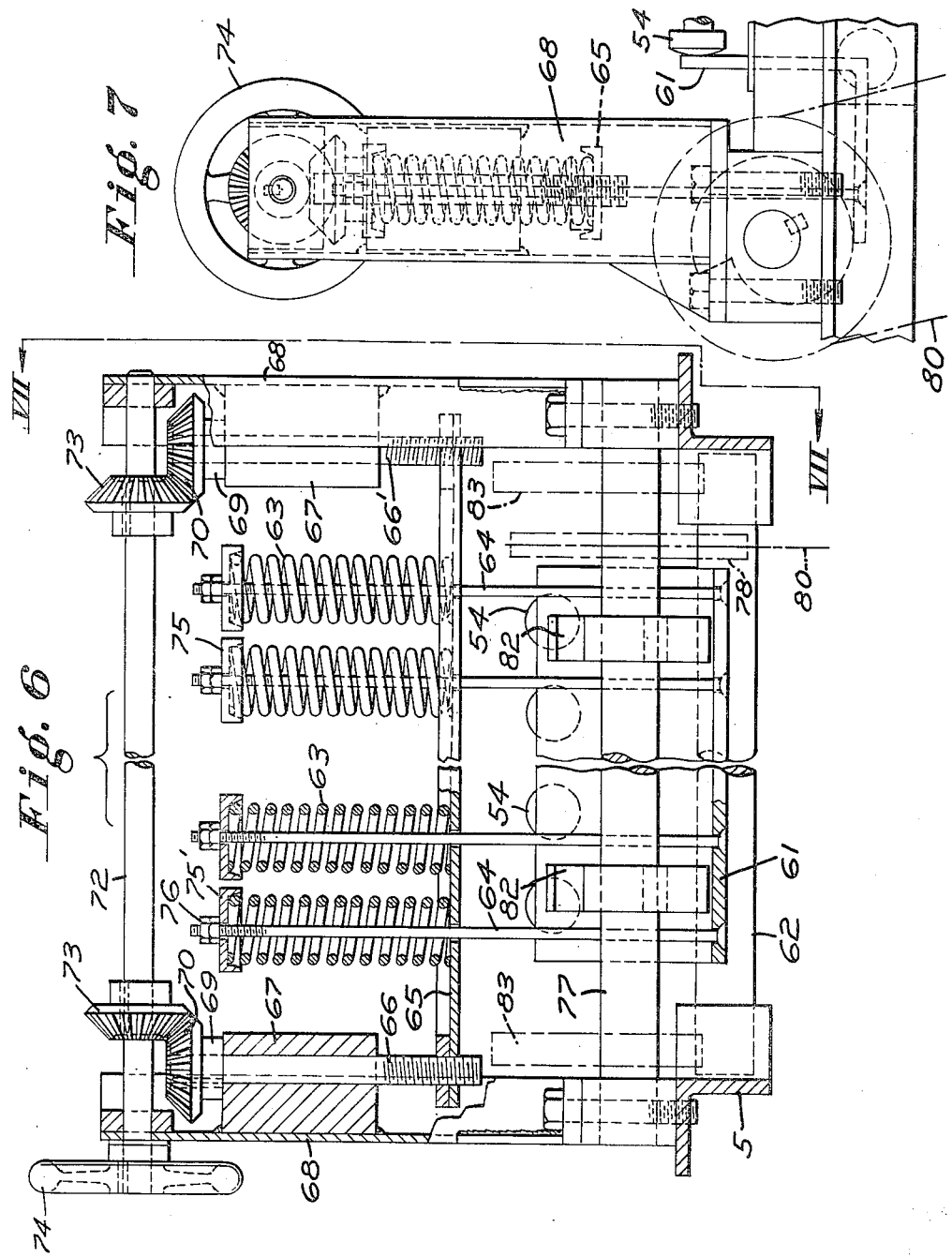
INVENTOR.
FREDRICK GUENTHER
BY
Bean, Brooks, Buckley & Bean,
ATTORNEYS.

United States Patent Office 2,765,830
Patented Oct. 9, 1956

2,765,830

RECIPROCATING HAMMER TYPE NUT CRACKING MACHINE

Fredrick Guenther, Derby, N. Y.

Application May 28, 1953, Serial No. 358,131

12 Claims. (Cl. 146—12)

This invention relates generally to the nut cracking art, and more particularly to a new and useful machine for mechanically cracking nuts.

Despite considerable research and development effort in the art of nut cracking machinery over the past several decades, all aimed at providing a practical machine for efficiently and properly removing the shells without damaging the meats, prior art nut cracking machinery possess various disadvantages. After many years of study and work in this art, including the development of various machines all of which have possessed certain advantages over prior art machines, I have developed the herein-disclosed nut cracking machine which so far as I am aware meets every need of the nut cracking industry and is considerably superior to machines of this general nature heretofore developed.

The primary disadvantage of prior art nut cracking machines is that they do not consistently crack the nuts in the desired manner and therefore are relatively inefficient from the viewpoint of quality. What is desired is to remove the shell of the nut without damaging the meat thereof, and it will be appreciated that this presents a considerable problem in that nut shells are of widely varying thickness and hardness not only between nuts of different types but between different nuts of the same type. In addition, with certain nuts such as, for example, walnuts there is a shell web interlocking with two halves of the nut meat, and it is desired that such nuts be cracked with the shell and web separating, leaving only the meat in neatly divided halves. Even in those machines which crack nuts by an electrical discharge there are various disadvantages not only because of the various electrical connections and other parts required for the electrical discharge, but also in that the electric shock tends to sear the nut meat and thus injure the same, by burning the oily skin thereon.

From the standpoint of quantity, which it will be appreciated is of vital importance for efficient operation, many prior art machines are relatively inefficient. In many instances, such machines do not accommodate themselves to nuts of different size, or they require that the nut assume a particular position within the machine if they are to be properly cracked, whereby the machine is severely limited either in the type of nuts which it can properly handle, or in its speed of operation. In addition, many prior art machines will accommodate only a relatively few nuts at a time and are therefore relatively expensive and impractical.

Accordingly, it is a primary object of this invention to provide a practical nut cracking machine which will properly crack an orchard run of nuts in an extremely efficient manner.

Another object of this invention is to provide a nut cracking machine wherein the nut is cracked by a mechanical explosion which shatters the shell, as distinguished from prior art arrangements wherein the shell is crushed.

A further object of this invention is to provide a nut cracking machine which will properly crack nuts with a high degree of consistency and with a high output, which will automatically adjust itself to nuts of different size, and which can readily be adjusted to accommodate nuts of different shell thickness.

It is also an object of this invention to provide, in a nut cracking machine, a snap-acting cracking mechanism wherein the nut is lightly pressed against the cracking member and the cracking member is delivered a sharp blow to snap the same through a limited stroke to cause the nut shell to explode and shatter.

In addition, it is an object of this invention to provide a nut cracking machine wherein the carrier mechanism holds the nut while it is cracked whereby to provide a highly efficient operation.

A nut cracking machine according to my invention is characterized in one instance by the provision of a cracking mechanism including a cracking member which is movable through an extremely limited stroke, a spring backed floating bar for lightly pressing a nut against the cracking member, and hammer means arranged to strike the cracking member with considerable force whereby to snap the same through its stroke to shatter and mechanically explode the nut shell.

A nut cracking machine according to my invention is characterized in another instance by the provision of a novel conveyer or carrier adapted for step-by-step movement and having a series of rows of individual, open-ended containers for cracking a multiplicity of nuts simultaneously with the nuts being cracked in the carrier containers.

The foregoing and other objects of my invention will become readily apparent upon a perusal of the ensuing detailed description, taken together with the accompanying drawings illustrating what is presently considered to be a preferred embodiment and wherein:

Fig. 1 is a view in side elevation, with certain parts broken away for greater clarity;

Fig. 2 is a plan view, partly in section, taken about on line II—II of Fig. 1;

Fig. 3 is a fragmentary detail view in side elevation of one of the cracking mechanisms in retracted position;

Fig. 4 is a fragmentary detail view similar to Fig. 3 but showing the cracking mechanism in a second position following a cracking operation;

Fig. 5 is an enlarged, fragmentary detail view of the conveyer mechanism;

Fig. 6 is an enlarged detail view taken about on line VI—VI of Fig. 1 and illustrating more in detail the hammer actuating and tension adjusting mechanism; and Fig. 7 is a detail view taken about on line VII—VII of Fig. 6.

Referring now to the accompanying drawings, the machine is supported by a frame construction generally designated 1 and including upright corner members 2, top members 3, bottom members 4 and intermediate members 5, all of which members can be conventional angle members secured together in a manner known in the art. Frame 1 can be enclosed by sheet metal but such is not shown for clarity of illustration.

The conveyer or carrier mechanism, illustrated primarily in Figs. 1 and 5, is generally designated 6 and comprises a pair of driving sprocket wheels 7 carried at opposite ends of a shaft 8 rotatably journaled in brackets 9 secured to the top frame members 3 on opposite sides of frame 1 as by means of bolts. While Fig. 1 shows but one side of the conveyer 6, it will be understood that the other side view thereof is identical to that shown in Fig. 1. Thus, there is a pair of spaced driving sprocket wheels 7 carried adjacent the opposite ends of shaft 8, a first pair of spaced idler sprocket wheels 10 carried by a shaft 11 rotatably journaled adjacent its opposite ends in spaced brackets 12 bolted or otherwise secured to the intermediate frame members 5, and a second pair of idler sprocket wheels 13 carried by a shaft 14 journaled for rotation in spaced brackets 15 bolted or otherwise secured to the bottom frame members 4.

Conveyer 6 is of the endless type, and to this end there are provided a pair of endless chains 16 training around the sets of driving and idler sprocket gears 7, 11 and 13, as illustrated in Fig. 1. Said chains 16 are of a conventional construction comprising an endless series of pivotally connected links 17, and nut containers 20 are arranged in horizontal rows extending between and fastened to the chains 16. Thus, as illustrated in Figs. 2 and 5, there is provided an endless series of horizontal rows of containers, each row containing multiple containers 20 of open-ended cylindrical tubular construction. For example, the cylinders may be two inches in diameter and two inches in length.

The cylinders of each row are secured to frame members 21 and 22 extending across the top and bottom thereof, respectively, as by welding. In addition, cylinders 20 are secured to each other at their side portions, as by welding. Each of members 21 and 22 can be of crowned construction, as illustrated in Fig. 1, and said members are joined at their opposite ends by end plates 23 secured adjacent the top and bottom edges thereof to chains 16. Plates 23 are pivotally secured to chains 16 as by mounting the same on extended shafts 24 of adjacent links 17, plates 23 being secured on said shafts by any conventional means as for example cotter pins or the like. Thus, it will be appreciated that the instant conveyer provides an endless series of rows of cylinders 20, there being for example twenty cylinders in each row, and these cylinders are carried by the conveyer.

As previously set forth, the conveyer is driven with a step-by-step motion, and for this purpose there is provided an electric motor 26 of for example ½ H. P. mounted on base frame members 4 as by being bolted to a support base 27 secured thereto. A ratchet wheel 28 is mounted on shaft 8 at one side of the machine, and a spring-backed ratchet pawl 29 pivoted in a bracket 30 rotatable about shaft 8 is adapted to impart a step-by-step motion to shaft 8 through ratchet wheel 28, bracket 30 being oscillated by a reciprocating drive rod 31 pivotally connected at one end thereof to bracket 30 and at the opposite end thereof to an eccentric 32 mounted on the drive shaft 33 of motor 26. Ratchet wheel 28 and pawl 29 can be of any conventional construction and arrangement, the details thereof per se forming no part of this invention, and appropriate gearing can be provided as desired for imparting the desired speed to conveyer 6. Also, rod 31 can be adjusted in length by nuts 31 to advance the stroke thereof.

A feed hopper 35 is mounted on frame 1 by conventional means and is disposed with its outlet closely adjacent conveyer 6 as the same moves upwardly from idlers 13. It will be observed that cylinders 20 are so arranged on the conveyer that when the conveyer 6 is moving in a substantially vertical direction said containers 20 are disposed with their longitudinal axis alined substantially horizontally whereby the nuts 37 will automatically move by gravity into the containers 20 as the same move past the open end of hopper 35, all as clearly indicated in Fig. 1. Each container 20 is adapted to carry one nut, and hopper 35 extends the width of a row of containers, whereby each row of containers will accommodate a total number of nuts equal to the number of containers in such row, and these nuts are then conveyed upwardly with a step-by-step motion to the cracking station adjacent the intermediate frame members 5 and indicated by the cracking mechanisms generally designated 38. Also, there is provided a vertically extending shield 6' having spaced wall parts arranged adjacent each end of containers 20 and extending from the feed hopper to the discharge point to prevent the nuts from falling out of the containers, said walls being apertured at the cracking station and adjacent the feed hopper.

The speed of travel of the conveyer 6 is arranged so that as each row of nuts reaches the cracking station the conveyer momentarily halts to permit a simultaneous cracking operation on all of the nuts in that row which is at the cracking station, the conveyer then moving another step to bring the succeeding row of nut containers into alinement with the cracking station. In this way each row of nuts is cracked and then moved upwardly as indicated by the arrows in Fig. 1 until the same passes over drive sprocket wheels 7 at which point the row of containers pivots and is disposed with the longitudinal axis of each container in substantially vertical alinement whereby the meats and cracked shells fall outwardly therefrom by the force of gravity into a discharge hopper 39 which extends from side to side of frame 1 and which is inclined, as clearly illustrated in Fig. 1, whereby the cracked shells and nut meats move under the force of gravity from the upper to the lower end of discharge hopper 39.

It will be appreciated that this operation is continuous, and that so long as there are nuts in hopper 35 they will continue to be picked up one to each container and moved with step-by-step motion up to the cracking station where they are cracked and then over the driving sprockets where the containers are emptied, being then conveyed past the idling wheels 10 and 13 until they are again brought into loading disposition at feed hopper 35. It will be seen that with this arrangement there is provided a very compact and highly efficient conveyor mechanism adapted for the continuous cracking of multiple nuts simultaneously and for the automatic loading and discharge thereof, and wherein the nuts are cracked in the conveyor containers and need not be removed therefrom for cracking purposes.

There is provided a cracking mechanism for each container in a row of containers. Therefore, when there are twenty containers in each row there will be twenty cracking mechanisms, with a common actuating mechanism for all of said cracking mechanisms. Inasmuch as the cracking mechanisms are identical, only one thereof will be described in detail although it will be appreciated from the foregoing and from Fig. 2 that there are a number thereof disposed at the cracking station.

A platform member 40 is secured to the intermediate frame members 5 in a conventional manner so as to span the same from one side of the machine to the other, and a pair of upright support members 41 and 42 are arranged adjacent opposite sides of platform 40, support 41 being disposed adjacent conveyor 6 and support 42 being disposed adjacent the opposite side of platform 40. Support members 41 and 42 have alined apertures therein and a plurality of floating bars 43, equal in number to the number of containers 20 in each row thereof, are disposed within said alined apertures for reciprocation therein. Each of bars 43 is provided with a laterally extending flange 44 formed intermediate its opposite ends, and a relatively light backing spring 44' is disposed around each bar 43 between support 42 and flange 44, whereby each member 43 is lightly biased into the adjacent nut carrying container 20 at the cracking station. As an example, bars 43 can be made of steel each weighing approximately four pounds, and springs 44' can be designed to exert from three to four pounds of force sufficient to lightly urge bars 43 into the containers 20 or to the left in Fig. 1.

A pair of rack members 45 are disposed on opposite sides of platform 40, being confined by guide members 46 for sliding movement therealong, and said rack members are joined for movement in unison by a transverse bar 47 fixed thereto adjacent its opposite ends so as to be movable therewith. It will be noted that upon sliding rack members 45 in one direction, to the right in Fig. 1, bar 47 engages flanges 44 to retract bars 43 against springs 44' out of container engaging position and out of the path of conveyer 6.

A second platform member 50 is mounted on intermediate frame members 5 to extend between opposite sides of the machine on the opposite side of conveyer 6 from platform 40, and said platform 50 carries spaced uprights 51 and 52 having a series of alined apertures for slidably receiving therein a series of cracking valves or plungers 53 equal in number to the number of containers 20 in each row of containers. As clearly illustrated in Fig. 2 cracking valves 53 and bars 43 are disposed in opposition to each other on opposite sides of conveyer 6 and are each equal in number to the number of containers 20 in each row of containers and are alined therewith.

Cracking valves 53 are slidable within the apertures in supports 51 and 52, and it will be noted that each cracking valve is provided with an enlarged head portion 54 adapted to bear against one side of support 52 and thus limit the sliding movement of the valve 53 in that direction, as well as an intermediate flange 55 adapted to bear against the opposite side of support 52 and thus limit the motion of cracking valve 53 in the opposite direction. Said enlarged heads 54 and flanges 55 are designed to provide a limited valve stroke having a range of from one-eighth to one-quarter of an inch and preferably approximately three sixteenths of an inch, which stroke remains constant.

Gear segments 56 are pivoted to platform 50 adjacent the opposite sides thereof intermediate supports 51 and 52, as at 57, and each of said segments is geared to a bar 58 adapted for being moved with a reciprocating straight line motion by said gear segments 56 and arranged to engage against flanges 55 of valves 53 for retracting the latter as is clearly apparent from Figs. 3 and 4. Rack members 45 are each provided with spaced pins 59 and 59' disposed on opposite sides of the gear segments 56, whereby as members 45 are moved in one direction, to the left in Fig. 2, pins 59' engage segment 56 to pivot the same away from the position illustrated in Fig. 2 and thus move bar 58 away from flanges 55. Conversely, upon movement in the opposite direction, to the right in Fig. 2, pins 59 cause segments 56 to pivot to the position illustrated in Fig. 2 and thus move bar 58 against flanges 55 to retract cracking valves 53 to the position illustrated in Fig. 3. Heads 54 of cracking valves 53 are designed to receive the blow of a hammer, and in accordance with a preferred embodiment of my invention a hammer mechanism is provided as follows. The hammer is in the form of an angle iron 61 pivoted at its opposite ends to the intermediate frame members 5, as at 62, said angle member having an upright leg portion adapted to engage the enlarged heads 54 of cracking valves 53. The other leg portion of angle member 61 is secured to two pairs of compression spring elements, each designated 63, by means of tie rods 64.

Referring now particularly to Figs. 6 and 7, it will be noted that springs 63 are arranged with one pair thereof adjacent one end of angle member 61 and the other pair thereof adjacent the other end of member 61, said springs bearing at their lower end against a transverse member 65 threadedly engaging shafts 66 and 66' equipped with a right-hand and a left-hand thread, respectively. Shafts 66 and 66' are journaled for rotation in bearings 67 secured to upright frame members 68 carried by the intermediate frame members 5, as by welding the same thereto, and at their upper ends shafts 66 and 66' are each equipped with a collar 69 and a bevel gear 70. A spring load adjusting shaft 72 extends between frame members 68, being rotatable thereon, and is equipped with bevel gears 73 engaging bevel gears 70 and a manually operable handle wheel 74 for selectively rotating shaft 72 to vary the elevation of member 65 and thus vary the load on springs 63. It will be noted that tie rods 64 extend through apertures in member 65 and through springs 63, being secured to the opposite end thereof as by cap members 75 and threaded nuts 76 engaging the ends of springs 63 and rods 64. With this arrangement, upon depressing the laterally extending leg portion of member 61 springs 63 will store up potential energy which when released will cause the upright portion of member 61 to strike head portions 54 of cracking valves 53.

The cracking and conveyor mechanisms are synchronized as follows. A shaft 77 is journaled for rotation in frame members 68, and carries thereon a sprocket wheel 78 which is driven from a sprocket wheel 79 mounted on the drive shaft 33 of motor 26 by a chain drive 80. In this way, whenever motor 26 is in operation shaft 77 is constantly rotated. Spaced cam members 82 are mounted on shaft 77 for rotation therewith, and said cam members bear against the laterally extending leg portion of hammer member 61 and are provided with cam tracks arranged to first depress said laterally extending leg portion of member 61 to compress spring members 63, and then suddenly release said lateral leg portion by reason of a discontinuity in the cam tracks as indicated at 82', whereby member 61 pivots under the influence of springs 63 against heads 54 of cracking valves 53 with a snap action to snap said valves to the right from the position illustrated in Fig. 3 to that illustrated in Fig. 4. Shaft 77 also carries two other cam members 83 which bear against cam followers 84 carried by the sliding rack members 45 previously described for moving the same, and said cam members 83 are synchronized with cam members 82.

The operation of this machine is as follows. Conveyor 6 moves with a step-by-step motion induced by the ratchet drive mechanism, whereby the various rows of containers 20 are advanced first past the feed hopper 35 from which nuts are deposited one to each container, each row of containers then advancing upwardly in a step-by-step manner to the cracking station. Cams 82 and 83 are synchronized with the ratchet drive of conveyor 6 whereby as conveyor 6 is moved cams 82 depress the laterally extending leg portion of hammer 61 to compress springs 63 and simultaneously cams 83 bear against cam followers 84 carried by rack members 45 and urge the same against the bias of springs 44', to the right as viewed in the drawing. This action of rack members 45 causes bar 47 to engage flanges 44 and thus move bars 43 against the bias of their springs 44' to completely remove said bars from the path of conveyor 6. At the same time, such motion of rack members 45 causes guide pins 59 to bear against gear segments 56 which pivot and cause bar 58 to engage flanges 55 of the cracking valves 53 to retract said valves to the left as viewed in the drawing, thus removing said cracking valves from the path of conveyor 6. In this way, with the parts assuming the position illustrated in Fig. 3, potential energy is stored in springs 63 and cracking valves 53 and floating bars 43 are moved out of the way of conveyor 6.

Then, when conveyor 6 momentarily stops with a row of containers 20 at the cracking station, the tracks of cams 83 recede to permit rack members 45 to move in the opposite direction, to the left in Figs. 3 and 4, thus freeing bars 43 which then advance under the influence of springs 44' to engage the nuts within the row of containers 20 and lightly press the same against the end of cracking valves 53. Such movement of rack members 45 also frees the cracking valves for their cracking stroke, pins 59' engaging segments 56 to pivot the same and move bar 58 away from flanges 55. At this point, the tracks of cams 82 recede abruptly whereby springs 63 snap hammer 61 about its pivot 62 and against the enlarged heads 54 of cracking valves 53 with considerable force, thus snapping cracking valves 53 through their extremely short stroke to shatter the shells of the nuts. The various cracking mechanism parts are then in the position illustrated in Fig. 4. Cams 82 then depress the laterally extending leg portion of hammer 61 to pivot the same backwardly and cams 83 bear against cam followers 84 to move rack member 45 to retract cracking valves 53 and floating bars 43 as previously described, restoring said parts to the position illustrated in Fig. 3 wherein conveyor 6 is again free to advance one step. This step-by-step action with a cracking operation intermediate each step continues as long as the machine is in operation.

A particular feature of my invention resides in the cracking arrangement producing a mechanical explosion to shatter the nuts. By first pressing the nut lightly against the cracking valve, and then imparting a sharp hammer blow to the cracking valve to snap the same through an extremely short stroke such as from one-eighth to one-quarter of an inch, the shells are literally exploded from the nuts, as distinguished from a crushing action, without harming the nut meats. It will be noted that the bars 43 yieldably urge the nut against the cracking valves throughout the cracking operation, and it would appear that when the cracking valves are hit by the hammer mechanism and snapped through their stroke such action against the yieldable bars 43 serves to shatter the shells of the nut with the reaction of the floating bars to such snap action of the cracking valves causing the shattered shells to completely separate from the nut meat. In the case of nuts such as walnuts having a web interlaced with the nut meat and joining the shell thereto I have found that with the aforesaid cracking arrangement the nut meats are neatly cracked in half such as to completely remove the shell and web therefrom. It will be noted that the cracking mechanism automatically adjusts itself to nuts of different size, and the floating bar springs are sufficiently light so that they merely lightly press the nuts against the cracking valves, each bar 43 being independently sprung whereby its movement is determined by the size of the nut. In addition, it is not necessary for the nut to be in any particular position in the container 20, inasmuch as the explosion operation of my cracking mechanism does not require any particular alinement of the nut with the cracking valve. Should it be desired to use the machine for cracking different types of nuts having different shell hardness, the stroke of the cracking valves remains the same and handle 74 is merely turned to adjust the load on springs 63. I have found that from 25 to 50 pounds of pressure on each spring 63 provides a sufficient hammer effect to insure proper operation of my cracking mechanism.

Another feature of my invention resides in the particular formation of the cup-shaped ends 85 and 86 of the cracking valves 53 and backing bars 43 respectively. It will be noted that such cup-shaped ends 85 and 86 are of flat bottom form having inclined side walls of frusto-conical form, and I have found that through the use of such flat-bottom cup-shaped ends in place of rounded or otherwise configurated ends, and with the flat bottoms bearing against the nuts, a much better quality of cracking is consistently obtained, other formations tending to crush the nut.

In addition, it should be noted that the conveyor containers 20 also hold the nuts during the cracking operation whereby the nuts need not be removed from and then returned to the conveyor as in many prior art machines, thereby providing an efficient operation.

Therefore, it will be appreciated that a nut cracking machine according to my invention fully accomplishes the aforesaid objects, and provides for a very high quality quantity output in an efficient and practical manner. For example, a machine according to my invention can readily be constructed to handle 900 pounds of nuts per hour, cracking the same in the desired manner. While I have disclosed in detail a preferred embodiment of my invention, it will be appreciated that the same is not necessarily limited to such details but may incorporate various modifications and refinements thereof and may assume other forms without departing from the invention as defined in the appended claims.

Having fully disclosed and completely described my invention, together with its mode of operation, what I claim as new is:

1. In a nut cracking machine having a cracking station and means for conveying nuts to and away from said cracking station, a cracking mechanism at said cracking station comprising, a cracking valve member mounted for limited sliding movement between a retracted position and a cracking position, means moving said cracking valve member to its retracted position as a nut is being conveyed to said cracking station, a spring-biased bar operable upon delivery of a nut to said cracking station to lightly and yieldably urge the nut against said cracking member while the latter is in its retracted position, and a hammer mechanism for striking said cracking member and snapping the same from its retracted to its cracking position against the spring bias of said bar to mechanically explode the nut shell without destroying the nut meat, said hammer mechanism including a spring, a hammer adapted to strike said cracking valve member and retractible against the action of said spring to load the latter, and means operable automatically to first retract said hammer against the action of said spring and then trip the spring-loaded and retracted hammer to snap the same against said cracking valve member while said bar is yieldably urging the nut against said cracking valve member.

2. A cracking mechanism as set forth in claim 1, together with spring adjusting means for selectively varying the normal loading of said hammer spring to thereby vary the force of the blow delivered by said hammer against said cracking valve member.

3. A nut cracking machine comprising, an intermittently movable carrier having a series of open-ended containers each arranged to carry a nut therein to and from a cracking station and to momentarily stop at said cracking station, a cracking valve mounted at said cracking station for limited sliding movement into and out of one end of a container positioned thereat, a floating bar mounted at said cracking station for sliding movement into and out of the opposite end of the container positioned thereat, first control means synchronized with the movement of said carrier for automatically retracting said cracking valve and said floating bar when said carrier is moving and for automatically releasing said cracking valve and said floating bar when said carrier momentarily stops between movements thereof, spring means biasing said floating bar for movement into said opposite end of the container at said cracking station to lightly and yieldably urge the nut therein against said cracking valve, snap acting hammer means adapted to strike said cracking valve and snap the same through its limited movement into said one end of the container and against the urging of said bar to shatter the nut shell, and second control means synchronized with the movement of said carrier and with said first control means for actuating said hammer means when said carrier momentarily stops and when said cracking valve and said floating bar have been released.

4. In a nut cracking machine having a feed station, a cracking station, and a discharge station, a nut carrier comprising an endless series of rows of multiple containers with each container being open at the opposite ends thereof and being adapted to carry one nut at a time, means for driving said carrier with a step-by-step motion past said stations in the order named, a cracking valve for each container in a row thereof, said cracking valves being arranged at said cracking station and having a limited reciprocating stroke adjacent one end of said containers, a spring-biased bar for each container in a row thereof, said bars being arranged at said cracking station for reciprocating movement into the opposite ends of said containers for lightly and yieldably pressing the nuts therein against said cracking valves, automatic control means synchronized with said carrier for simultaneously retracting said cracking valves and said bars out of the path of said carrier when the latter is moving and for simultaneously releasing said valves and said bars when said carrier stops between each movement thereof, and a snap-acting hammer mechanism for driving all of said cracking valves simultaneously through their limited stroke with a snap action to shatter the nut shells, said hammer mechanism including hammer means arranged to strike said cracking valves, backing spring means for said hammer means, and means synchronized with the movement of said carrier for automatically retracting said hammer means against the action of said backing spring means to load the latter and then tripping the spring-loaded hammer means when said bars have moved against the nuts to urge the same against said cracking valves.

5. The combination set forth in claim 4, wherein said control means comprises reciprocating sliding members arranged on opposite sides of said valves and bars, a first transverse member carried by said sliding members and movable therewith to engage all of said bars and retract the same against their springs, a second transverse member having gear teeth at opposite ends thereof and movable into engagement with said cracking valves for retracting the same, pivoted gear segments meshing with said second transverse member for moving the latter, means carried by said sliding members for movement therewith and bearing against opposite sides of said gear segments to pivot the same and thereby move said second transverse member in a direction opposite to the direction of movement of said sliding members, cam means driven in synchronism with said carrier, and cam follower means carried by said sliding members and bearing against said cam means.

6. The combination set forth in claim 4, wherein said hammer means comprises a pivoted angle member having one leg portion adapted to strike all of said cracking valves simultaneously and another leg portion connected to said backing spring means, and cam means driven in synchronism with said carrier and bearing against said other leg portion, said cam means being operable to first depress said other leg portion against the action of said backing spring means and then abruptly release the same for pivoting movement against said cracking valves by said backing spring means.

7. In a nut cracking machine having a feed station, a cracking station, and a discharge station, a nut carrier comprising an endless series of rows of containers, there being multiple containers in each rows thereof and each container being open at the opposite ends thereof and adapted to carry one nut at a time, means driving said carrier with a step-by-step motion past said stations in the order named, whereby said rows of containers are brought with a step-by-step motion from said feed station to said cracking station and then to said discharge station, said rows of containers being momentarily stopped at said cracking station for cracking of the nuts within the containers, and cracking means automatically operable to simultaneously crack all of the nuts in the row of containers momentarily stopped at said cracking station, said cracking means including cracking valve members for each container in a row thereof, said cracking valve members having a limited reciprocating stroke into one end of the containers at the cracking station, spring biased bars for each container in a row thereof, said bars being movable in opposite directions into the opposite end of the containers at said cracking station for lightly urging the nuts therein against said cracking valves, means operable upon such momentary stopping of a row of containers at said cracking station to drive said cracking member through their stroke against said spring biased bars for cracking the nuts in said containers, and means automatically operable to retract said cracking members and said bars out of the path of said containers when said carrier is moving.

8. The combination set forth in claim 7, wherein said containers comprise open-ended cylinders, and each row of containers comprises multiple cylinders fixed to each other in side-by-side relation and fixed to common brace members extending along the top and bottom thereof.

9. The combination set forth in claim 8, wherein said carrier comprises spaced-apart endless chains, and said rows of containers are mounted on said chains by means of plates connected to said brace members adjacent the opposite ends thereof and each pivotally connected to the adjacent chain at spaced points therealong.

10. A nut cracking machine, comprising, in combination, a cracking mechanism, and a carrier having open-ended container means movable with a step-by-step movement past said cracking mechanism and adapted to bring said container means into operative association therewith, said cracking mechanism comprising a cracking valve movable through an extremely limited stroke into and out of one end of said container means, a floating bar positioned for movement into and out of the opposite end of said container means, control means synchronized with the movement of said carrier for retracting said cracking valve and said bar out of the path of said container means when the latter is moving and for releasing said valve and said bar when said container means stops thereat, spring means for urging said bar into said container means to lightly urge a nut therein against said cracking valve, and a snap-acting hammer mechanism including spring means, hammer means adapted to strike said cracking valve, and means synchronized with movement of said carrier for retracting said hammer means against said spring means to load the same and then suddenly releasing said hammer means to drive said cracking valve through its stroke with a snap action to shatter the nut shell, said cracking valve and said bar each having at the end thereof adjacent said carrier a flat bottom cup portion adapted to bear against a nut.

11. The combination set forth in claim 7, wherein said containers comprise tubular cylinders having a length and a diameter of approximately two inches.

12. In a nut cracking machine having a cracking station, nut carrier means for bringing a row of nuts to said cracking station for simultaneous cracking thereof, and a cracking mechanism comprising a cracking valve for each nut thus brought to the cracking station, said cracking valves having a limited reciprocating stroke against one side of the nuts at said cracking station, a spring biased bar for each nut thus brought to said cracking station, said bars being arranged at the other side of the nuts at said cracking station for reciprocating movement in line with said cracking valves, whereby said cracking valves and said bars are movable toward and away from each other, said bars moving under the spring urge thereof against the nuts at said cracking station for individually urging the nuts against said cracking valves, said bars remaining yieldable throughout the cracking operation, means synchronized with said carrier for retracting said cracking valves and said bars out of the path of said carrier when said carrier is moving and for releasing said valves and said bars when said carrier stops at said cracking station, and a snap acting hammer mechanism for driving all of said cracking valves simultaneously through their limited stroke and against the urging of said bars with a snap action shattering the nut shells, the springs biased bars reacting to separate the shattered shells from the nut meats, said hammer mechanism including hammer means arranged to strike said cracking valves, backing spring means for said hammer means, and means synchronized with said carrier for automatically retracting said hammer means against the action of said backing spring means to load the latter and then tripping the spring loaded hammer means when said bars have moved against the nuts to urge the same against said cracking valves.

References Cited in the file of this patent

UNITED STATES PATENTS

| | | |
|---|---|---|
| 397,863 | Kuhlmann et al. | Feb. 12, 1889 |
| 1,703,989 | Colecliffe et al. | Mar. 5, 1929 |
| 2,346,980 | Lotspeich | Apr. 18, 1944 |